Figure 1:
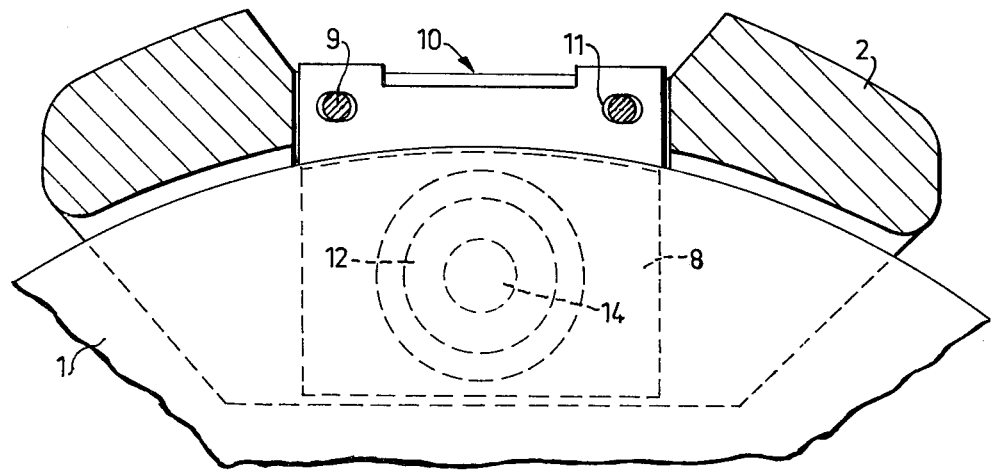

United States Patent [19]
Borjesson

[11] 3,876,042
[45] Apr. 8, 1975

[54] ARRANGEMENT FOR ELIMINATING SQUEAKING IN VEHICLE BRAKES

[75] Inventor: Sven Borjesson, Goteborg, Sweden

[73] Assignee: Aktiebolaget Volvo, Goteborg, Sweden

[22] Filed: Jan. 18, 1974

[21] Appl. No.: 434,594

Related U.S. Application Data
[63] Continuation of Ser. No. 185,779, Oct. 1, 1971, abandoned.

[30] Foreign Application Priority Data
Oct. 6, 1970  Sweden............................ 13520/70

[52] U.S. Cl.............................. 188/73.5; 188/217
[51] Int. Cl............................................ F16d 65/00
[58] Field of Search ....... 188/71.1, 72.2, 72.4, 72.5, 188/72.6, 73.3, 73.5, 217

[56] References Cited
UNITED STATES PATENTS
3,186,518  6/1965  Rodway............................ 188/72.4
FOREIGN PATENTS OR APPLICATIONS
1,390,274  1/1965  France............................ 188/72.2

Primary Examiner—George E. A. Halvosa
Attorney, Agent, or Firm—Young & Thompson

[57] ABSTRACT

In an arrangement for eliminating squeaking in disc-type vehicle brakes, the arrangement comprising an equalizing element arranged between the brake shoe and the brake piston, the improvement that the equalizing element is guided with a certain clearance in a plane parallel to the brake shoe and the surfaces of the element bearing against the brake piston and the brake shoe, respectively, are of considerably different size.

5 Claims, 2 Drawing Figures

PATENTED APR 8 1975 3,876,042

ARRANGEMENT FOR ELIMINATING SQUEAKING IN VEHICLE BRAKES

This is a continuation, of application Ser. No. 185,779, filed Oct. 1, 1971, now abandoned.

The invention relates to an arrangement for preventing squeaking in disc-type vehicle brakes and includes an equalizing element disposed between the brake shoe and the brake shoe engaging surface. In drum brakes and also in disc brakes, mechanical vibrations of high frequency, e.g. of the order of 3000–4000 Hz, are generated when the brakes are applied, owing to the friction forces occurring between the brake lining and the brake drum or brake disc, respectively. These vibrations cause unpleasant sound effects, which have been found very difficult to overcome.

Various attempts have been made to eliminate or dampen these vibrations, for example by increasing the stiffness of the brake shoe and/or the brake disc or to increase the thickness thereof, but these measures have only resulted in changing the frequency of the vibrations. One method of reducing squeaking in brake drums is to mount on the drum secondary, arcuate resonance elements, the ends of which are caused to abut the drum and the centre portion of which are secured tightly adjacent the drum, while the intermediate portion is curved outwardly, whereupon as the drum vibrates the ends of the elements move relative to the drum and take up the energy of vibration.

It has been discovered, however, that the vibrations of a disc brake can be reduced and squeaking completely eliminated when the vibration movements of the brake shoe can be dampened by friction against a moving element which comprises an intermediate link between the brake piston and the brake shoe. The surfaces of the element which bear against the brake shoe and the brake piston shall be of different size, whereby uniform distribution of the surface pressure between the brake shoe and the brake piston is obtained independently of whether the brake disc and/or the brake shoe are positioned obliquely in relation to the brake piston.

The present invention is mainly characterized in that the equalizing element is guided with a certain clearance in a plane which extends parallel to the brake shoe, and in that the size of the surface of the element which bears against the brake shoe differs considerably from the surface of the element which bears against the brake piston.

Figure 2:
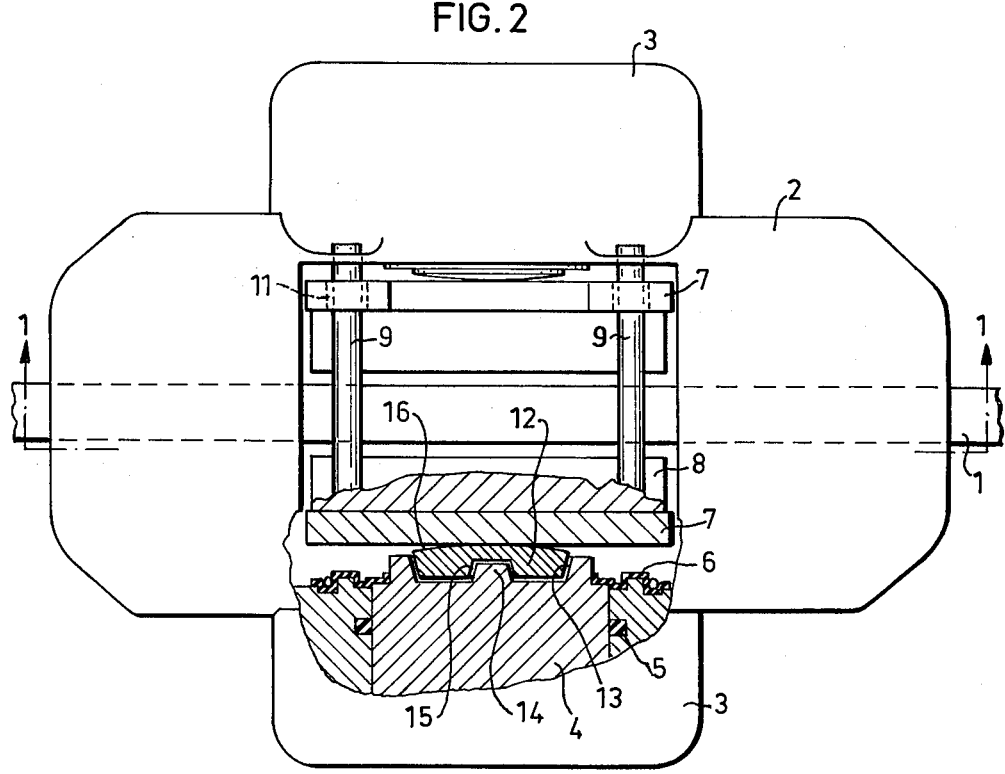

The invention will now be described with reference to the accompanying drawing, in which FIG. 1 illustrates diagrammatically a sectional side view of a disc brake along the line I—I in FIG. 2, and FIG. 2 is a partially sectioned plan view of the disc brake.

The disc brake is of the type normally found in vehicles and comprises a brake disc 1 capable of rotating with a wheel axle, and a yoke 2 secured to a stationary portion of the vehicle. The yoke surrounds the edge portion of the brake disc 1 and on either side of the disc and at right angles thereto are mounted brake cylinders 3 which are connected to a common hydraulic brake system. Each brake cylinder 3 is provided with a piston 4, which is movable at right angles to the brake disc and which is accurately guided in the brake cylinder and sealed against its inner wall by means of a seal ring 5. Since the outwardly projecting end of the brake piston 4 is exposed to splashing water and other contaminants, the joint between the piston 4 and the cylinder wall is protected by an elastic muff 6. Arranged on either side of the brake disc 1 so as to be movable towards and away from said disc is a brake shoe 7 provided with a brake lining 8 which faces the disc 1. The brake shoes 7 are jounalled on pins 9 which are mounted in the yoke 2 and guided for restricted movement thereby. For the purpose of restricting the movement of the pins 9, the brake shoes 7 are provided with a radial flange 10 in which are disposed through-holes 11 for the pins 9, the arrangement being such that the brake shoes 7 are able to move freely without the risk of jamming.

When the brakes are applied, forces occur which attempt to force the brake shoes 7 to accompany the rotary movement of the disc. Owing to the free but limited movement of the brake shoes 7, these forces tend to incline the brake shoes 7 so that they do not lie fully perpendicular to the axis of the brake piston 4. The brake application force is thus not distributed symmetrically over the brake lining 8. The friction occurring between the disc 1 and the brake lining 8 gives rise to vibrations in the brake shoes 7, which in turn can result in a squeaking sound.

In accordance with the invention, a suitably circular equalizing element 12 is inserted in a recess 13 disposed in the end of the brake piston 4, the recess 13 having substantially the same shape as the rear side of the element 12, but is sufficiently large to permit slight movement of the element 12 in a plane which extends parallel to the brake. The side walls of the recess 13 together with a central outwardly projecting peg 14 which fits into a corresponding recess 15 in the element 12, prevents the element from moving out of the recess 13 in the piston 4. The side 16 of the equalizing element 12 facing the brake shoe 7 is convex or has some other suitable configuration, e.g. frusto-conical, so that only an extremely small portion of the side 16 bears against the brake shoe 7, whereby the equalizing element 12 operates as a type of ball joint so that the brake force over the brake shoe 7 and the brake lining 8 always uniformly distributes the surface pressure irrespective of whether the brake shoe 7 is obliquely positioned relative the brake disc 1 or not. Thus, owing to its restricted movement the equalizing element 12 will operate as any energy absorbing element which dampens any vibratory movement of the brake shoe 7 and thus prevents squeaking when the brakes are applied. It should be mentioned that although the actual area of contact between the side 16 of the element and the brake shoe 7 is very small, it should preferably not be in the form of a spot contact.

Although the invention has been described and illustrated with reference to one embodiment thereof, the invention can be modified within the scope of the following claims. For example, the equalizing element 12 may be let into a recess in the brake shoe 7 with the small support surface arranged so as to face the brake piston 4.

What I claim is:

1. A disc-type vehicle brake, comprising a brake shoe having a brake lining, a brake piston actuating the brake shoe, and an equalizing element disposed between and bearing on two sides of the brake shoe and brake piston that face each other, one of said shoe and piston having a recess therein in which said element is disposed with clearance in a direction parallel to said shoe, said element having a substantially convex surface that bears against the other of said shoe and piston, said element and the bottom of said recess having flat surfaces which are in sliding contact with each other over an area which is parallel to said shoe and which is substantially greater than the area of contact between said element and the other of said shoe and piston.

2. A brake as claimed in claim 1, said substantially convex surface being frusto-conical.

3. A brake as claimed in claim 1, said recess being in said piston, said piston having a frusto-conical peg at the center of the bottom of said recess that fits into a complementary recess in the flat surface of said element.

4. A brake as claimed in claim 3, said recess in said piston having a frusto-conical outer side wall complementary to the shape of the outer side wall of said element.

5. A brake as claimed in claim 1, said element being circular and having a diameter several times its thickness.

* * * * *